United States Patent Office 3,564,822
Patented Feb. 23, 1971

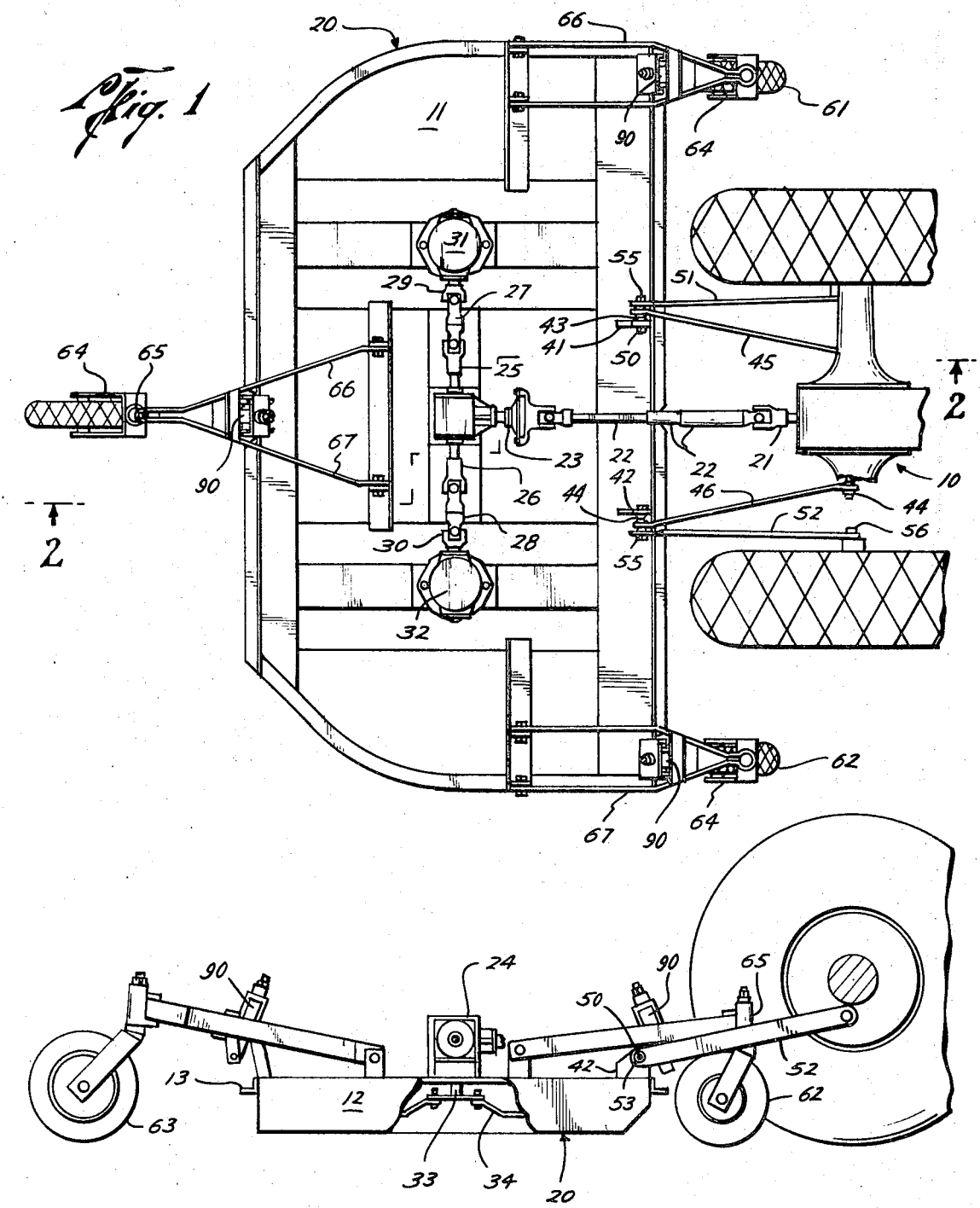

3,564,822
FULL FLOATING MOWER
Anthony R. Engler, Houston, Tex., assignor, by mesne assignments, to Douglass Industries, Inc., Houston, Tex., a corporation of Texas
Filed Nov. 21, 1968, Ser. No. 777,692
Int. Cl. A01d 35/26
U.S. Cl. 56—25.4        2 Claims

ABSTRACT OF THE DISCLOSURE

A mower, intended to be drawn by a pulling body such as a tractor, the mower having a rigid frame, independently mounted and triangularly spaced wheel structures, plural cutting blades permitting a wide cutting swath within the unitary rigid frame. The linkage to the pulling body permits relative vertical motion of the mower relative to the tractor as well as relative twisting motion, but restricts relative lateral motion.

BACKGROUND OF THE INVENTION

This invention relates to power operated rotary mowers, and more particularly to those intended to be drawn behind a tractor, and used to cut grass, or the like, along broad areas such as along highway rights of way. Particular problems normally encountered in such operations include those caused by undulating terrain. The connection between the pulling body and the mower should be such that the plane of the mower may vary from that of the tractor. Further, the mower should be rugged and should be, very mobile, i.e., should be able to traverse an arcuately varying path behind the tractor. These problems have been attacked, in this invention by the novel hitch means, in combination with the rigid mower body and the triangularly spaced resilient wheel structures.

DESCRIPTION OF THE PRIOR ART

The concept of the need for a resilient wheel structure has been suggested by Pat. No. 3,344,476. Examples of other mower patents include Nos. 3,015,927, 2,994,174, 3,043,082, and 2,952,961. The last mentioned patent utilizes plural cutting blades, but within separate, but attached, carriages, rather than within a single rigid housing, as described in this application.

SUMMARY OF THE INVENTION

This invention includes (a) a rigid mower housing, (b) plural, spaced-apart cutting blades within the housing, (c) hitch means connecting the mower to a tractor, so as to permit substantial movement of the mower in a vertical plane, as well as twisting movement, but restricting relative lateral movement, (d) an operable connection between the tractor power take-off and the panel cutting blades, and (e) resiliently and swivelingly mounted, triangularly spaced wheel means for making the mower self-supporting, and keeping the mower blades substantially planar with the underlying ground surface, i.e., allowing it to follow the ground's contour.

DESCRIPTION OF THE DRAWINGS

FIG. 1 is a plan view of the mower, mounted on a tractor, only portions of the tractor being shown; and FIG. 2 is a section taken along lines II—II of FIG. 1, parts being broken away for clarity of illustration.

DESCRIPTION OF A PREFERRED EMBODIMENT

Consider the drawings together. A tractor or similar source of motive power is generally illustrated at 10, and a mower body at 20. The mower body has a rigid frame including top cover 11, sides 12, and front and rear chain guard assemblies 13, the chains themselves not being shown in the drawings. The means of coupling the tractor to the mower body includes the following. The normal tractor power take-off is generally shown at 21. Coupled thereto is one end of the mower's drive shaft 22. The other end of the drive shaft is linked by virtue of a slip-clutch assembly 23 to a center gear box 24. This linkage in and of itself is conventional, and therefore, all details thereof need not be fully illustrated or described. Gear means within center gear box 24, such as a bevel gear, is used to actuate the oppositely disposed cutter blades. This activation occurs by virtue of left and right center gear box output shafts 25 and 26. Said shafts are linked to left and right yoke assemblies 27 and 28, and the yoke assemblies to left and right drive shafts 29 and 30. These drive shafts, by virtue of suitable gear arrangements, or the like, within left and right side gear boxes 31 and 32, cause rotation of vertical cutter blade shafts, only shaft 33 being shown in FIG. 2, the cutters, such as 34, being affixed toward the lower end of such shafts 33. The presence of these spaced wide angle cutting blades permits a wide swath of cutting action.

The mower body 20 is further joined to the tractor body 10, by hitch means hereinafter described, in a manner permitting the mower body to be substantially self-supporting, thereby reducing the horsepower necessarily provided said tractor. Spaced hitch lugs 41, 42 extend upwardly from the front of cover 11. Horizontally extending bolts 50 extend through apertures provided in said hitch lugs. Ball joints 43, 44 are provided on each of said bolts, as well as on a horizontal axle on said tractor as shown in FIG. 1. Overlying said ball joints are oppositely spaced bell cranks 45, 46. This connection permits relative free pivoting of said cranks with the ball joints. Adjacent pins 55 passing through bolts 50 and ball joints 43, 44, levers 51, 52 are positioned on bolts 50, the apertures through said levers, such as 53 being somewhat larger than the diameter of bolts 50. At their other ends, said levers 51, 52 are pivotally positioned on lug extensions on axle 56. Thus, the permissive motion of levers 51, 52 and cranks 45, 46 permit relative vertical motion between the mower and the tractor, relative twisting motion, but restrain relative sidewise motion. Triangularly spaced around mower body 10 are front wheels 61, 62 and rear wheel 63. Each of these wheel assemblies is like that shown in application Ser. No. 619,987, filed Mar. 2, 1967, now Pat. No. 3,435,599 and includes yoke assembly 64 providing the mounting for the wheel, the yoke being mounted to swivel by virtue of a shaft affixed to the yoke, said shaft being rotatably mounted within housing 65. The wheel assembly is joined to the mower frame by side braces 66, 67. Spring means 90, only generally shown are joined to the wheel assembly and to the mower, frame to permit cushioning action. The details of this mounting are fully shown in the above described application. The details as such are not critical here other than as necessary to describe the pivoting action permitted the wheels relative to the mower body, and the triangular spacing so as to permit the mower to be substantially self-supporting.

In summary, the various combination of elements described above form a mower capable of being towed behind a tractor. The hitch includes cranks mounted on ball joints at both their mower and tractor ends, and includes levers pivotally mounted on bolts provided said mower and tractor. By virtue of enlarged bolt apertures in said levers, relative vertical and twisting motion between the mower and tractor is not restrained, but relative lateral motion is so restrained, thus permitting the mower to accommodate itself to the terrain, but be guided arcuately behind the tractor. Individually pivotable wheels are triangularly spaced around the mower body, making itself supporting. Spaced cutter blades are driven by the tractor power take off by virtue of intermediate gear means. Thus a wide cutting surface is provided within a unitary mower body.

Although a single embodiment has been depicted, it is obvious that numerous modifications are possible by one skilled in the art without departing from the spirit of the invention, the scope of which is intended to be limited only by the following appended claims.

I claim:
1. A mowing machine comprising:
    a rigid body;
    three swivelled, resiliently mounted, ground engageable wheels provided said body and triangularly positioned whereby they support substantially the entire weight of said body;
    rotatable cutter blade means carried beneath the top of said body;
    vertical shaft means connecting said body with said cutter blade means;
    hitch means on said body and extending forwardly therefrom for linking said body with a towing vehicle having a power take off, said hitchmeans including means permitting relative vertical and twisting motion between said body and said towing vehicle but restricting relative lateral motion, said motion permitting means including a pair of fixed lug portions extending upwardly of said housing and spaced levers connected at one end to a portion of said towing vehicle and at the other end to bolt means linked to said lug portions, said levers having apertured portions of substantially greater diameters than that of said bolt means for permitting said relative twisting motion; and
    means on said body operably attached to said power take off and to said cutter blades adapted to permit rotation of said cutter blades on power being supplied to said power take off.

2. The mowing machine of claim 1 wherein said hitch means includes spaced connector members adjacent said levers, each connector being movably fixed at one end to ball joint means positioned on said bolt means and at the other end to similar ball joint means provided said towing vehicle.

References Cited
UNITED STATES PATENTS

| | | | |
|---|---|---|---|
| 3,043,082 | 7/1962 | Northcote et al. | 56—25.4X |
| 3,135,079 | 6/1964 | Dunn | 56—25.4X |
| 3.208,207 | 9/1965 | Bottenberg | 56—25.4 |
| 3,263,766 | 8/1966 | Strack | 56—25.4X |
| 3,400,521 | 9/1968 | Caldwell | 56—25.4X |
| 3,404,518 | 10/1968 | Kasper | 56—25.4 |
| 3,418,790 | 12/1968 | Whitfield et al. | 56—25.4X |
| 3,435,599 | 4/1969 | Engler | 56—25.4 |
| 3,452,530 | 7/1969 | Kulak | 56—6X |
| 3,483,683 | 12/1969 | McCanse | 56—25.4 |

RUSSELL R. KINSEY, Primary Examiner

J. N. ESKOVITZ, Asssitant Examiner

U.S. Cl. X.R.
56—6